United States Patent
Wehrwein (10) Patent No.: US 8,799,859 B2
(45) Date of Patent: Aug. 5, 2014

(54) AUGMENTED DESIGN STRUCTURE MATRIX VISUALIZATIONS FOR SOFTWARE SYSTEM ANALYSIS

(75) Inventor: Bradley Wehrwein, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 152 days.

(21) Appl. No.: 13/475,014

(22) Filed: May 18, 2012

(65) Prior Publication Data

US 2012/0297364 A1 Nov. 22, 2012

Related U.S. Application Data

(60) Provisional application No. 61/487,859, filed on May 19, 2011.

(51) Int. Cl.
*G06F 9/44* (2006.01)
*G06F 11/36* (2006.01)

(52) U.S. Cl.
CPC .............. *G06F 8/75* (2013.01); *G06F 11/3664* (2013.01)
USPC ............................. 717/123; 717/120; 717/121

(58) Field of Classification Search
None
See application file for complete search history.

(56) References Cited

U.S. PATENT DOCUMENTS

| | | | | |
|---|---|---|---|---|
| 7,174,536 B1 * | 2/2007 | Kothari et al. | ................. | 717/123 |
| 7,174,540 B2 * | 2/2007 | Ondrusek et al. | ............. | 717/121 |
| 7,496,594 B1 * | 2/2009 | Cummings et al. | ............ | 717/121 |
| 7,512,929 B2 * | 3/2009 | Sangal et al. | ................. | 717/100 |
| 7,546,577 B2 * | 6/2009 | Do et al. | ........................ | 717/108 |
| 7,966,356 B2 * | 6/2011 | Sangal et al. | ................. | 717/120 |
| 8,042,098 B2 * | 10/2011 | Do et al. | ........................ | 717/123 |
| 8,332,816 B2 * | 12/2012 | Stienhans | ...................... | 717/120 |
| 8,413,115 B1 * | 4/2013 | Surprise et al. | ............... | 717/123 |
| 8,464,208 B2 * | 6/2013 | Feigen | .......................... | 717/104 |
| 8,479,149 B2 * | 7/2013 | Kuriakose et al. | ............ | 717/120 |
| 8,650,539 B2 * | 2/2014 | Gobel | .......................... | 717/120 |
| 8,713,521 B2 * | 4/2014 | Ananthanarayanan et al. | ............................. | 717/121 |
| 2002/0046394 A1 * | 4/2002 | Do et al. | ....................... | 717/108 |
| 2002/0170042 A1 * | 11/2002 | Do et al. | ....................... | 717/143 |
| 2004/0255272 A1 * | 12/2004 | Ondrusek et al. | ............. | 717/120 |
| 2005/0160411 A1 * | 7/2005 | Sangal et al. | ................. | 717/144 |
| 2005/0289513 A1 * | 12/2005 | Chen et al. | .................... | 717/121 |

(Continued)

OTHER PUBLICATIONS

Abdeen et al., Package Reference Fingerprint: a Rich and Compact Visualization to Understand Package Relationships, [Online] Apr. 2008, 12th European Conference on Software Maintenance and Reengineering, 2008. [Retrieved from the Internet] <http://ieeexplore.ieee.org/stamp/stamp.jsp?tp=&arnumber=4493316> pp. 213-222.*

(Continued)

*Primary Examiner* — Thuy Dao
*Assistant Examiner* — Ravi K Sinha (57) ABSTRACT

A design matrix structure visualization technique and tool for the study and analysis of systems, such as software systems, where the bounds of the matrix are defined by a selected focusing metric and entities forming the system are displayed in the matrix as blocks of size relative to their proportion of the selected focusing metric. Relationships between entities are illustrated by summing all relationships between individual elements forming each displayed entity. Where possible, an identifier defining the characteristic of a displayed block is also shown. Preferably, the technique and tool includes a "zoom" feature to allow a user to drill down and uncover details associated with smaller blocks as shown in the original view.

13 Claims, 4 Drawing Sheets

(56) References Cited

U.S. PATENT DOCUMENTS

| | | | |
|---|---|---|---|
| 2007/0288899 A1* | 12/2007 | Fanning et al. | 717/124 |
| 2012/0284691 A1* | 11/2012 | Aljammaz et al. | 717/120 |
| 2013/0111438 A1* | 5/2013 | Yoshimura et al. | 717/120 |
| 2013/0219362 A1* | 8/2013 | Cai et al. | 717/123 |

OTHER PUBLICATIONS

Caserta, P.; Zendra, O., Visualization of the Static Aspects of Software: A Survey, [Online] Jul. 2011, IEEE Transactions on Visualization and Computer Graphics,vol. 17, No. 7, [Retrieved from the Internet] <http://ieeexplore.ieee.org/stamp/stamp.jsp?tp=&arnumber=5557869> pp. 913-933.*

Elmqvist et al., ZAME: Interactive Large-Scale Graph Visualization, [Online] Mar. 2008, IEEE Pacific Visualization Symposium, 2008. PacificVIS '08., [Retrieved from the Internet] <http://ieeexplore.ieee.org/stamp/stamp.jsp?tp=&arnumber=4475479> pp. 215-222.*

Ghoniem, M.; Fekete, J.; Castagliola, P., A Comparison of the Readability of Graphs Using Node-Link and Matrix-Based Representations, [Online] Oct. 2004, . IEEE Symposium on Information Visualization, 2004. INFOVIS 2004, [Retrieved from the Internet] <http://ieeexplore.ieee.org/stamp/stamp.jsp?tp=&arnumber=1382886> pp. 17-24.*

Neeraj Sangal, Ev Jordan, Vineet Sinha, and Daniel Jackson, Using dependency models to manage complex software architecture, [Online] 2005 (OOPSLA '05), [Retrieved from the Internet] <http://delivery.acm.org/10.1145/1100000/1094824/p167-sangal.pdf> pp. 167-176.*

* cited by examiner

AUGMENTED DESIGN STRUCTURE MATRIX VISUALIZATIONS FOR SOFTWARE SYSTEM ANALYSIS

CROSS-REFERENCE TO RELATED APPLICATIONS

This application claims the benefit of U.S. Provisional Application No. 61/487,859 filed May 19, 2011 and herein incorporated by reference.

TECHNICAL FIELD

The present invention relates to software system analysis within a computer system and, more particularly, to the use of an augmented design structure matrix (DSM) visualization tool and technique as part of a computer system for analyzing one or more aspects of a particular software system.

BACKGROUND OF THE INVENTION

Software systems of sufficient scale are inherently complex. No single visual representation of a software system provides enough information to support reasoning about all aspects of the system. For this reason, a software architecture is described using a set of views that are often created to address the needs of specific system users and to support each in reasoning about their specific concerns. For example, a developer (or maintainer) of a software system might be interested in the organization of the code into modules. In contrast, a performance engineer might be more interested in how the system processes information, or how elements of the system are assigned to various hardware components.

Software visualizations, like software architecture views, are created to address the needs of specific, different users. In order to visualize a software system, one needs to first extract both the structure and relationship data from the development artifacts (source code). Even though many tools exist for this extraction, the information these tools tend to provide is voluminous and far too much to comprehend all at once. One purpose of software visualization, therefore, is to simplify the available information so as to convey enough information for the stated purpose without overwhelming the user with detail unrelated to the specified goals.

Design structure matrices (DSMs) have long been used for visualizing and reasoning about the structure and relationships of software systems at the highest levels, and are well-suited for providing concise, unambiguous answers to a specific set of questions related to the understanding and analysis of a software system's structure (i.e., code entities) and relationships (i.e., dependencies). A DSM is a square matrix where a code entity of a given system is placed as a header of a row of the matrix, and also placed as a header of a column of the matrix. In typical representations, the row and column order of each code entity is the same such that the DSM content is mirrored across the upper-left to lower-right diagonal line, where self-dependencies (e.g., "A" depending on "A") appear along the diagonal of the matrix. Typically, the DSM is a binary matrix, where matrix cells contain either a 1 or a 0 (for example) to indicate a dependency of the code entity associated with the row on the code entity associated with the column.

In the context of the present invention, DSMs have been found to exhibit several properties that make them suitable for application to software systems analysis. Firstly, unlike graphical representations, the DSM representation scales and can describe and depict the inward and outward relationships between an extremely large set of code entities within the grid of the matrix. Additionally, DSMs are suitable for displaying hierarchical structural data and containment relationships—a close match to the file system structure within which developers logically organize the code entities into systems and subsystems, and the class hierarchy structure of object-oriented software systems.

Figure 1:
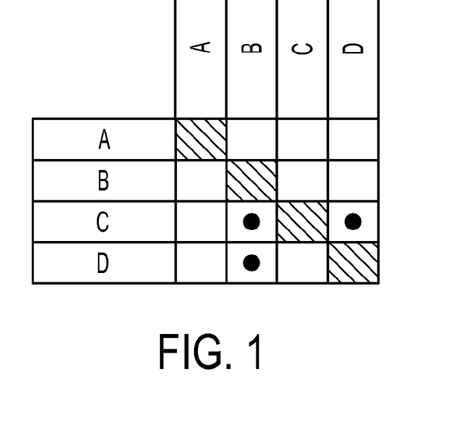
FIG. 1 is a simplified illustration of a Design Structure Matrix (DSM), showing an order of elements with respect to their level of abstraction.

DSMs are symmetric and, therefore, the order of elements along the axis can be changed without altering the representation semantics (as long as the same changes are made in the element ordering along each axis). For this purpose, as well as to aid in the analysis, algorithms have been developed to sort DSMs based on their dependency relationships (for example, from the highest to the lowest level of abstraction—in general, any specified ordering may be used). FIG. 1 illustrates a simple DSM, displaying a set of four elements A, B, C and D that have been sorted in this manner. Once sorted, violations in layering (dependency cycles) become directly visible as "above the diagonal" dependencies. That is, from the logic structure perspective, the existence of "above the diagonal" dependencies define a relationship from a lower level of abstraction upward to a high level, where this is counter to software engineering best practices. Referring to FIG. 1, the relationship between elements C and D is "above" the diagonal and should be evaluated. The remaining relationships shown in FIG. 1 are properly "downward"—from an element at a higher level of abstraction to an element at a lower level of abstraction.

Many tools currently exist for creating DSM visualizations of software systems from source code. Most of these tools allow a user to navigate through source code by collapsing and expanding successive levels of detail to move up and down through the file system or class hierarchy, allowing for the inspection of various code entity properties. One such tool is disclosed in U.S. Pat. No. 7,512,929, entitled "Apparatus and Method for Managing Design of a Software System Using Dependency Structure" and issued to N. Sangal et al. on Mar. 31, 2009. These various visualization tools are intended to provide complete contextual information about the displayed code entities (i.e., path and filename information), as well as detailed information about the number of inward and outward relationships and the existence of dependence between code entities—at least to the extent that the dependent entities are also directly present in the visualization.

It is this last point, however, that highlights the limitation in current DSM visualization techniques. Since the current DSM visualization techniques provide complete contextual information for its contents, and a user's screen size is finite, relationships to code entities not appearing in the visualization may not be displayed, or they may be displayed as aggregated relationship groupings at higher levels of abstraction. Similarly, structural entities are often displayed as higher level aggregations. As a result, only partial system information is displayed in the current DSM visualization techniques and as such it is only useful for inspecting and reasoning about the detailed relationships of a limited subset of the system's code entities at a time.

Thus, a need remains in the art for a way to utilize the DSM visualization technique that retains the detail required to fully define and analyze a specific software system, yet does not overwhelm the user (or the user's graphical capabilities) in the presentation of this detail.

SUMMARY OF THE INVENTION

The need remaining in the prior art is addressed by the present invention, which relates to performing software system analysis within a computer system and, more particularly, to the use of an augmented design structure matrix (DSM) visualization tool and technique as part of a computer system for analyzing one or more aspects of a particular software system.

In accordance with the present invention, a DSM visualization tool and technique has been developed that creates a view of a "full" software system, based upon a selected focusing mechanism that is utilized to guide an evaluation process to those code entities most relevant to the specific task at hand. Additionally, the DSM visualization is configured so as to ensure that the most relevant contextual information is displayed across all levels of abstraction. The displayed information contains an identifier for each of the larger blocks included in the display, as well as the total number of dependencies between the various displayed blocks.

The use of a focusing metric in accordance with the present invention allows for the desired "full view" of a software system to be retained, while essentially filtering the type of information that is displayed to only show that which is relevant to a specific user (as defined by the focusing metric).

The focusing metric may be an attribute of the source code itself, or any other useful parameter associated with the creation of the software system. Indeed, any quantifiable measure associated with the software system may be used as the focusing metric. For example, a focusing metric may be the total number of low level entities contained within a higher level entity, or a history of how many revisions have been created for each code entity, or virtually any measure of the system.

In a preferred embodiment of the present invention, the visualization tool retains the ability to "zoom" into lower levels of description of the system and update the "view" to show details within lower levels. That is, while the "full" view is the initial display, should a user want to further investigate smaller blocks in the display (for example, to determine the identifiers for blocks too small to include this in the original view), by virtue of retaining all of the information, any portion of the full visualization may be enlarged and studied in detail.

In one embodiment, the present invention is defined as a method for visually displaying relationships between code entities forming a software system comprising the steps of: defining a plurality of code entities forming the software system; determining and storing all relationships between various pairs of code entities forming the plurality of code entities; selecting a metric to be used in evaluating the software system; creating a design structure matrix visualization of the software system, using the selected metric as the definition of the coordinates of the matrix and displaying code entities as squares of size relative to the selected metric and arranged along a diagonal of the matrix according to a specified ordering (for example, from highest to lowest level of abstraction), with sub-entities of appropriate size displayed within their associated higher-level code entities, the design structure matrix being a symmetric square matrix with downward relationships from higher to lower code entities displayed below the diagonal and upward relationships displayed above the diagonal; determining aggregated values of relationships between pairs of code entities displayed in the design structure matrix visualization and displaying the aggregated values within the intersections between the pairs of appropriate code entities.

In another embodiment, a system is provided for creating a visual display of relationships between code entities forming a software system as a function of a user-defined focusing metric, the system including means for identifying and storing all relationships between various pairs of the code entities forming the software system, means for creating a design structure matrix visualization of the software system, using the focusing metric as the definition of the coordinates of the matrix and displaying code entities as squares of size relative to the selected metric and arranged along a diagonal of the matrix according to a specified ordering, with sub-entities of appropriate size displayed within their associated higher-level code entities, the design structure matrix being a symmetric square matrix with downward relationships from higher to lower code entities displayed below the diagonal and upward relationships displayed above the diagonal, and means for determining aggregated values of relationships between pairs of code entities displayed in the design structure matrix visualization and displaying the aggregated values within the intersections between the pairs of appropriate code entities.

Moreover, while the augmented DSM visualization technique of the present invention is described below in the analysis of a software system, it is contemplated that the same techniques can be used to view and analyze any system that contains a large number of inter-related elements, particularly a system that can be diagrammed as a tree structure comprising a large plurality of branches at various levels and a set of relationships between the leaf nodes at the lowest level of the tree structure.

Indeed, in this larger context of the present invention, an embodiment can be defined as disclosing a method for visually displaying relationships between entities forming a system, the system being of a hierarchical tree structure and including relationships between the lowest-level leaf node entities of the structure and comprising the steps of: defining a plurality of entities forming the system; determining and storing all relationships between various pairs of entities forming the plurality of entities; selecting a metric to be used in evaluating the system; creating a design structure matrix visualization of the system, using the selected metric as the coordinates of the matrix and displaying code entities as squares of size relative to the selected metric and arranged along a diagonal of the matrix according to a specified ordering, with sub-entities of appropriate size displayed within their associated higher-level code entities, the design structure matrix being a symmetric square matrix with downward relationships from higher to lower code entities displayed below the diagonal and upward relationships displayed above the diagonal; determining aggregated values of relationships between pairs of entities displayed in the design structure matrix visualization and displaying the aggregated values within the intersections between the pairs of appropriate entities. Similar apparatus for performing this method is also contemplated as being an embodiment of the present invention.

Thus, various other modifications and implementations are considered to fall within the spirit and scope of the present invention as will be discussed in detail hereinbelow.

BRIEF DESCRIPTION OF THE DRAWINGS

Referring now to the drawings.

DETAILED DESCRIPTION

Prior to describing the details of the inventive visualization technique, the following paragraphs will briefly describe a conventional DSM visualization tool as currently used in software system analysis. It is contemplated that with an understanding of the state of the current, the benefits of the augmented DSM visualization technique will be better appreciated.

Figure 2:
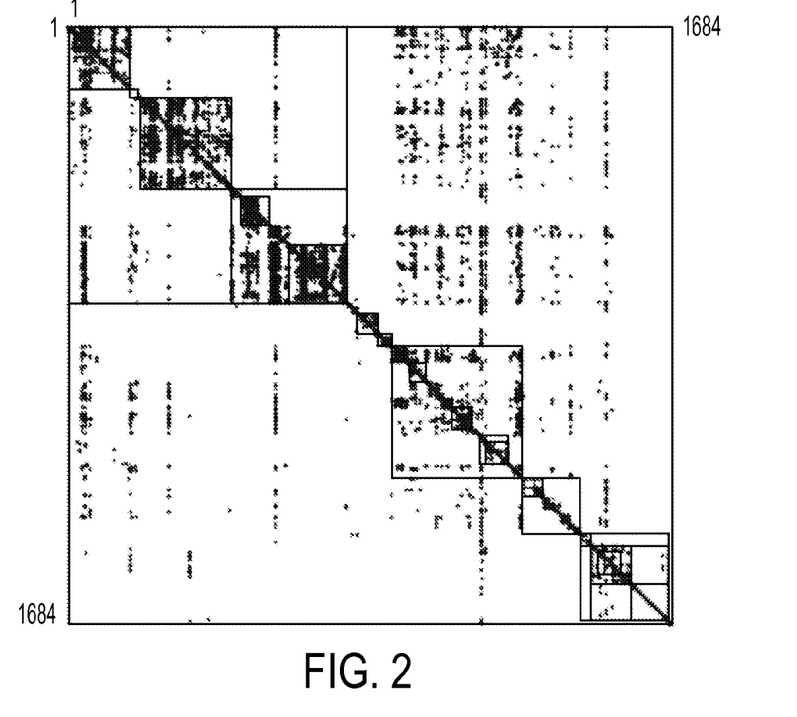
FIG. 2 is a prior art "full architectural view" DSM visualization.

FIG. 2 illustrates an example of a prior art DSM architectural view of a typical software system. The visualization itself may be displayed as a graphical user interface (GUI) on an individual's computer display, or other appropriate display device. In the particular visualization of FIG. 2, the matrix display is different from the version of FIG. 1. Here, the matrix is an illustration from a source to a target, with sources shown on the left ("y") axis and targets on the right ("x") axis. In order to retain all of the data of the complete software system (an attribute of the "full" visualization requirement of this prior art approach), the view as shown in FIG. 2 is "zoomed out" so as to encompass each code entity forming the system. As a result, it is virtually impossible to extract any meaningful information regarding a specific code entity. In this visualization, structural elements are rendered as nested squares, where the size of the square corresponds to the number of lowest-level code entities contained within each square (typically, the lowest level code entity is defined at the file level or function/variable level, depending on the input data). Sibling relationships in the hierarchy can be displayed adjacent to a specific "child" in this parent-child DSM architectural view in order to ensure that this information is included in the visualization. As with the diagram of FIG. 1, relationships are rendered as dots on the DSM visualization of FIG. 2, where the "X" and "Y" coordinates correspond to the endpoints of the dependency. For space reasons, this prior art DSM visualization cannot contain detailed information about the magnitude of dependencies; only the existence/non-existence of a relationship can be indicated. This limitation is overcome by the augmented visualization technique of the present invention, as will be discussed hereinafter.

It is obvious from a review of FIG. 2 that for non-trivial software systems comprised of a large number of code entities, it is impractical to display contextual information on the X and Y axes. Indeed, the only quantitative information displayed in the DSM visualization of FIG. 2 is the total number of lowest level entities (in this case, 1684) forming the software system.

The present invention addresses these limitations and proposes an augmented DSM visualization tool and technique, as implemented within a computer system, that better utilizes aspects of both the full and partial visualization techniques to present useful information. In accordance with the present invention, a visualization approach has been developed that allows a user to specify a metric to be studied. This metric is then used to "focus" a full DSM visualization to provide detailed attributes of the specified metric. The metric is used as the coordinate on the X and Y axes of the matrix representation, providing an excellent visual representation of the relationship between the selected metric and the complete software system.

As will be discussed in detail below, the augmented DSM visualization tool and technique of the present invention provides a unique display of a software system under review, retaining an "identifier" that labels important (i.e., "large") components of the system, as well as including a total number of relationships that are defined between these identified blocks. The ability to include this contextual information (entity name, dependency magnitude) where possible, while maintaining at least a minimal representation of all of the elements of the system, is a significant advantage over the prior art visualization techniques. As a result, the augmented DSM visualization tool is a more expressive medium for a high-level "green field" understanding of system activities than possible with any prior art approach.

Indeed, the augmented DSM visualization tool, by keying off of a defined focusing metric for review, reduces the "where to look" burden on the user by filtering the entire set of data associated with a software system to display only those elements sufficiently associated with the defined metric. The resulting visualization representation, where the size of each displayed block is a function of its relative importance to the defined metric, allows the user's eye (for example) to drawn to the "largest" code entities of concern, according to the defined metric. Obviously, automated techniques for studying the results of the augmented DSM visualization can be used in lieu of (or in addition to) an actual visual review by a user.

As will be explained in detail below in association with the discussion of FIGS. 3 and 4, the augmented DSM visualization tool of the present invention captures all of the structure (i.e., code entities) and relationships (i.e., dependencies) between various components of a software system under study, providing key contextual information about both by including an identifying label on the largest blocks and the "magnitude" (total number) of the related dependencies. The augmented approach of the present invention is considered to be suitable to serve as a single visual representation of a software system, created automatically without user intervention, as part of an automated software build process.

Figure 3:
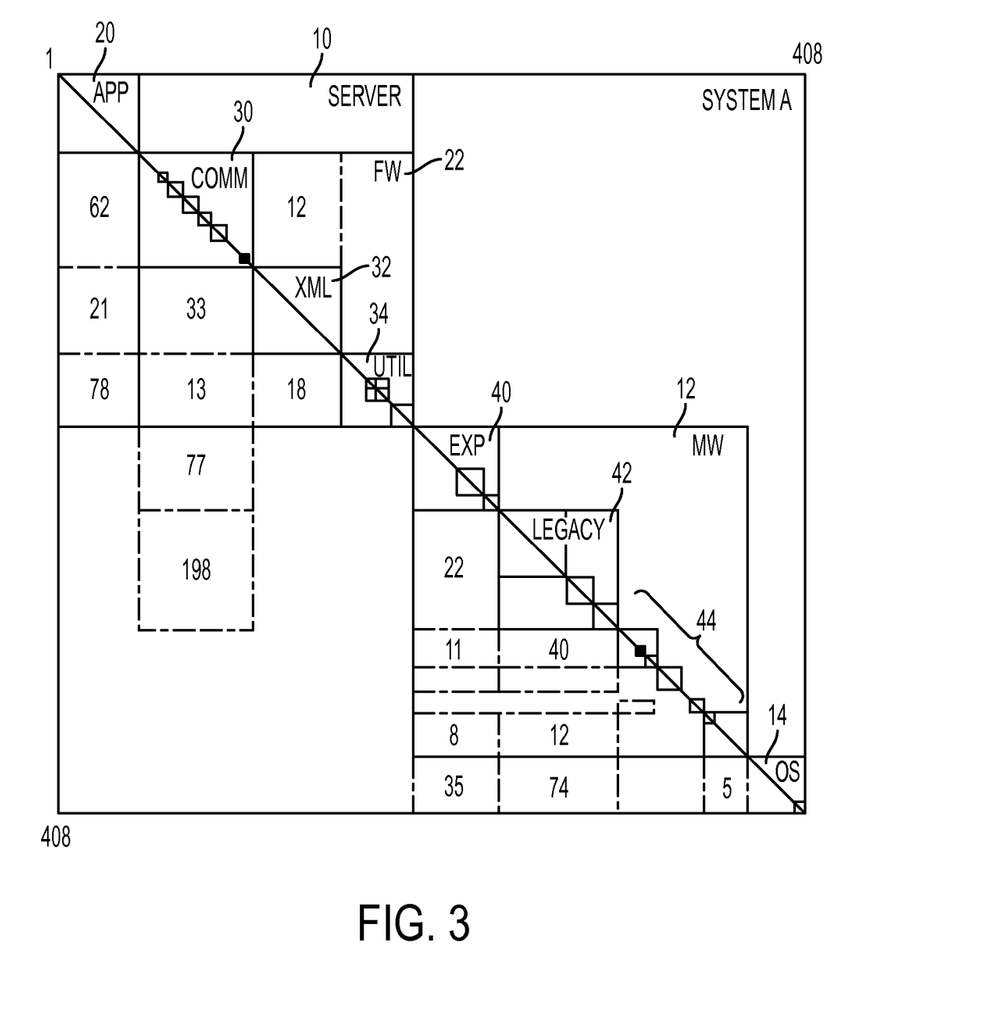
FIG. 3 is a full DSM visualization formed in accordance with the present invention, the focusing metric being the number of separate code entities comprising the system.

FIG. 3 illustrates an augmented DSM visualization as formed using the tool and techniques of the present invention, in this case using the number of contained lower-level code entities as a focusing metric. In order to understand the concepts of the present invention, the augmented DDM visualization technique is as applied to a relatively simple server application including a total of only 408 code entities. In the view of FIG. 3, the elements forming the server application are sorted such that the logical layering of this system is apparent.

In accordance with the present invention, dependencies between different elements are shown by the weight (magnitude) of relationships aggregated up to higher levels. These total dependency numbers are shown in blocks where the two elements intersect on the matrix. Rendering relationships this way hides relationship patterns, but greatly improves usefulness as a tool for reasoning about the severity of dependency cycles and the scale of coupling between components across all levels of abstraction.

The visualization as shown in FIG. 3 is created by a computer system including a processor and memory that supports a tool to analyze the software system. One exemplary tool is the Design Structure Analysis System (DSAS), which extracts function call dependencies and uses the DSM techniques described above to display relationships among code entities and calculate measures of design structure for the software system.

As previously mentioned, the focusing metric of the augmented DMS visualization as shown in FIG. 3 is associated with the relative scale of different parts of the software system, as measured by the number of lowest-level code entities contained within higher-level entities. In particular, each square along the diagonal (representing the structure(s) forming the software system) is rendered to display a size proportional to the number of code entities contained therein, where the larger squares also include an identifier that defines the specific code entity structure. Thus, the augmented visualization of the present invention provides size and relationship information for entities within a software system as a function of the defined metric. A user may employ such a visualization to obtain an overview of the system, as well as its levels of coupling. This visualization may also be helpful in reasoning about how much implementation exists in each component. In a different capacity, this particular visualization may be useful input for project managers in helping to determine how to distribute test resources, for example (i.e., more resources dedicated to largest entities).

At the highest level, the software system as presented in the augmented DSM visualization of FIG. 3 is shown as comprising a set of three top-level structural components, a server component 10, a middleware component 12 and an operating system component 14. As with the simplified DSM described in association with FIG. 1, the augmented DSM visualization formed in accordance with the present invention utilizes the "top left" hierarchy, with the meaning of the relationships between elements read from the top and left axes. That is, the visualization tool of the present invention is configured such that the "target" entity is on the left axis and the "source" entity is on the top axis, with the entity having the highest level of abstraction positioned "top left" and then decreasing in complexity along the axes. In contrast, the prior art visualization of FIG. 2 uses the opposite organization with the "target" entity on the top axis and the "source" entity on the left axis. The arrangement of the present invention is considered to be an improvement on this point and is considered to be a more natural technique in understanding the relationships between entities with "upward" (bad) and "downward" (good) relationships.

Based on the number of contained lower level code entities, server component 10 is shown in FIG. 3 as comprising two sub-components: (1) an application sub-component 20, likely containing system-specific business logic; and (2) a sub-component 22 taking the form of reusable elements that may be set aside as an initial server framework. As also shown, server framework 22 itself contains elements large enough to be depicted using the code entity focusing metric, where these specific elements are defined as providing functionality for communication (shown as comm element 30), an xml processing element 32 and a set of utilities 34.

In accordance with the present invention, the augmented DSM visualization as shown in FIG. 3 is created to illustrate the included number of lower level code entities as the metric being studied. Also shown in FIG. 3 is the total number of dependencies between pairs of code entities, which are aggregated and shown as a total number in the augmented DSM visualization of the present invention (also referred to herein as the "magnitude" of the relationship). The dependencies are shown in dotted-line rectangles so as to distinguish this information from the code entity rectangles displayed along the diagonal. As mentioned above, the meaning of the relationships between components are read from the top and left axes.

For example, application sub-component 20 is shown as having an outward relationship with communications functionality 30 within server framework 22, the aggregate shown as including a set of 62 separate outward relationships (dependencies). In the visualization of FIG. 3, the particular way dependencies are rendered depicts the weight of relationships aggregated up to higher levels. Rendering relationships in this way does "hide" relationship patterns, but greatly improves the usefulness of the inventive software visualization tool when attempting to analyze the severity of dependency cycles. Moreover, the visualization as shown in FIG. 3 particularly illustrates the scale of coupling between components across all levels of abstraction, as discussed above.

Continuing with a description of the augmented DSM visualization of FIG. 3, middleware component 12 is shown as containing both an experimental sub-component 40 and a legacy sub-component 42. An additional number of other sub-components (identified by reference numeral 44 in FIG. 3) are shown as included within middleware component 12, but none are found to contain enough code entities to warrant a fuller illustration. It is to be understood, however, that the tool of the present invention preferably includes a "zoom" capability so that these smaller code entities can be focused on and enlarged to enable more specific study.

In terms of describing more of the relationships between elements, it is shown that comm 30 of server 10 has a total of 77 outward relationships with experimental sub-component 40 of middleware component 12, and a total of 198 outward relationships with legacy sub-component 42. Within middleware component 12 itself, is it shown that experimental sub-component 40 has 22 outward relationships with legacy sub-component 42. All of this data, as well as each of the other aggregation of relationships shown in FIG. 3, is valuable information to an individual performing analysis of the complete system.

It is to be understood that the augmented DSM visualization tool of the present invention can be created for any desired metric. Indeed, the code entity size metric as shown in FIG. 3 should be considered as being exemplary only and, depending on the user goals, other metrics will, most likely, be more useful as a focusing measure. For example, a visualization depicting how cyclomatic complexity (i.e., the number of independent linear paths through a software system) is distributed throughout a software system may be a valuable tool for supporting test activities or identifying areas of increased risk of defects. In another embodiment, an augmented DSM visualization based upon a software system's "technical debt" (i.e., accumulated locations where further study is required) may be important, particularly moving forward into situations where persons other than the original software designers become involved in debugging and updating software systems. This latter visualization, in particular, can easily display specific modules/areas within a system that need updating, since it depicts how the technical debt is distributed throughout the software system.

Further, it is to be understood that the focusing metric used to create the augmented DSM visualization in accordance with the present invention need not be restricted only to metrics computable from the source code itself. For example, projects often capture other software development lifecycle artifacts in configuration management and defect tracking systems, and in project management tools.

Figure 4:
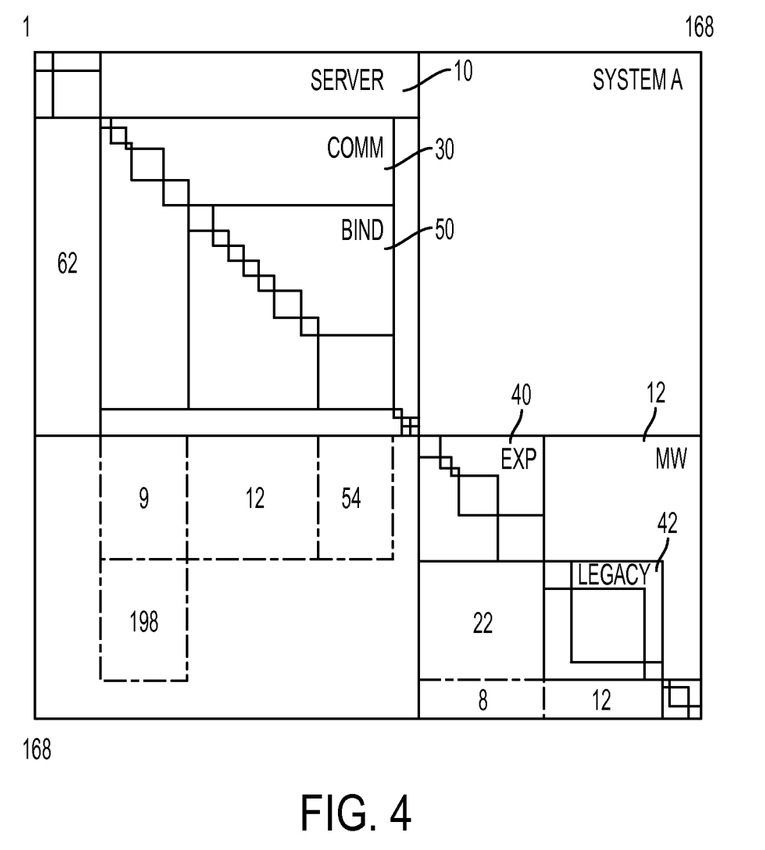
FIG. 4 is an alternative full DSM visualization formed in accordance with the present invention, where the focusing metric is defined as the number of defects identified in each element.

In particular, FIG. 4 illustrates an augmented DSM visualization that is created for a different purpose and, as a result, creates an entirely different depiction of the same software system as used to create the visualization of FIG. 3. In this case, the visualization of FIG. 4 is created based on using defect tracking data as the focusing metric. As shown, a total of 168 defects have been identified in the complete software system, where this number is used to define the "length" of both the X and Y axes of the matrix. In accordance with the present invention, regardless of the specific focusing metric employed, the larger blocks within the display will include an identifying label defining the code entity of the block, with the magnitude of the relationships between the displayed blocks included as well.

In accordance with the present invention therefore, the code entities are sized along the matrix as a function of the number of defects that have been identified within each specific code entity (for example, cumulatively identified since project inception). Defect-free code entities, therefore, are hidden while the defect-prone code entities are sized according to the modified scale of the matrix and will catch the eye of the user. Reviewing the visualization of FIG. 4 in detail, it is shown that communication component 30 accounts for a large number of defects. In comparison, communication component 30 makes up only about a sixth of the system in terms of the number of code entities, as shown in the visualization of FIG. 3.

As also shown in FIG. 4, there is a "bind" sub-component 50 within communication component 30 that accounts for a large number of defects, and yet this sub-component was too small to even be rendered in the code entity visualization of FIG. 3. This shows very clearly to the user that bind sub-component 50 is an exceptionally defect-ridden component, particularly in relation to its size. Without employing the augmented DSM visualization tool and technique of the present invention, this problem with bind sub-component 50 could easily remain hidden. Importantly, by also including the relationship magnitudes in the augmented visualization of the present invention, the impact of the bind sub-component's defects on the other components is easily grasped.

Indeed, each code entity in a system has different characteristics, properties and purpose. The same can be said about the code entities upon which they depend, or are depended upon by these entities. An architect with knowledge of the system can put all the available information together in context to evaluate different possible causes of various defects. For example, bind sub-component 50 is shown as having a relatively large number of outward relationships to experimental middleware component 40, particularly when compared to the relationship between bind sub-component 50 and the legacy middleware component 42. It is quite possible that the root cause of the defects in the bind sub-component is either the "bugs" remaining in the newer experimental component, or the interface within the bind sub-component to the experimental middleware component. The architect of the software subsystem may have an idea about which is more likely from other experiences within the project and with knowledge of both.

Beyond being an aid in identification of conditions such as the defect problem described above, the augmented DSM visualization tool and technique of the present invention can be used to investigate and analyze various aspects of a software system. The ability to focus the visualization onto a specific, defined metric allows for system developers, users, and the like to investigate, hypothesize about, and otherwise explore system properties. The use of the augmented visualization technique, by including identifying labels on larger blocks and the magnitude of the relationships between various blocks, allows for a user to easily and simply identify areas of concern.

Figure 5:
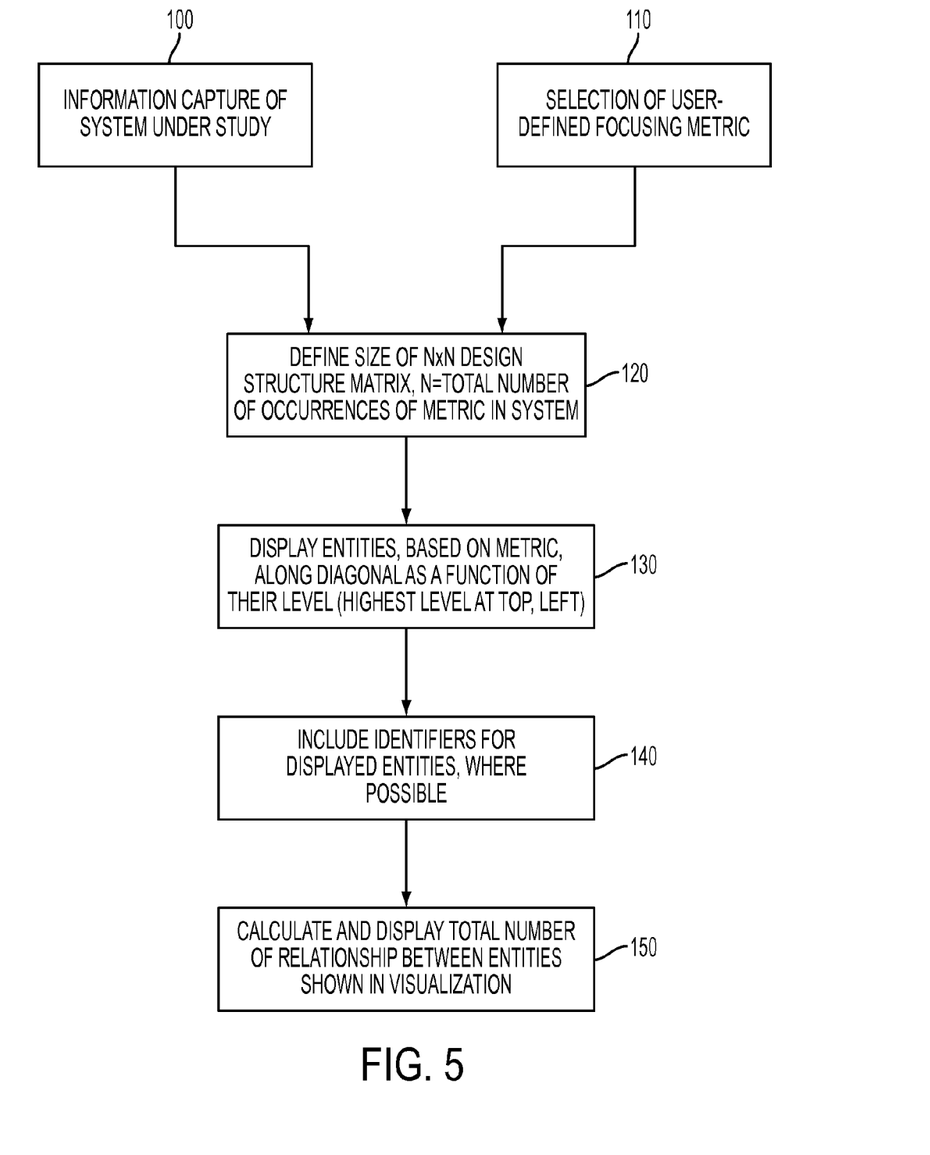
FIG. 5 is a high-level flowchart summarizing the utilization of the augmented DSM visualization tool and technique of the present invention.

In implementing the augmented DSM visualization technique of the present invention, the flowchart as shown in FIG. 5 is considered illustrative of an exemplary process that may be employed. The process begins by first preparing an information capture of all of the data associated with a specific software system under study (step 100). This data, in terms of the size of code entities, definitions of the code entities, relationships between entities, and the like, will serve as the platform for each analysis, regardless of the specific focusing metric being used. For a specific creation of an augmented DSM visualization, and as a separate event flow in the process, a user defines a desired focusing metric at step 110 (for example, level of technical debt associated with the software system). The "outputs" from both steps 100 and 110 are thereafter applied as inputs to the next step, the actual creation of the augments DSM visualization based on the defined focusing metric. As shown in FIG. 5, the process of creating a specific augmented DSM visualization is initiated by first defining the "size" of the matrix as a function of the metric (step 120). Specific elements are then populated along the diagonal of the matrix as a function of the number of occurrences of the defined metric found therein, with the elements rendered in the nested form described above (step 130). Identifiers are associated, where possible within the limits of the display, for the larger elements (step 140). The magnitude of the relationship between pairs of displayed elements is determined (step 150) and also displayed in its relevant location within the matrix.

Thus, by reviewing the displayed information, a user in this case will be able to easily pick out the largest entities to be investigated in terms of technical debt, with additional information regarding the relationship between these entities and the remaining parts of the system. While not specifically shown in the flowchart, it is to be understood that by first collecting all of the information associated with a specific system, the visualization technique of the present invention includes the capability to drill down and view details associated with smaller blocks that are shown in the "full", initial view. Additionally, the flow chart of FIG. 5 is considered to be exemplary only. There may be many variations to this diagram or steps (or operations) described therein without departing from the spirit of the invention. These variations are considered to be a part of the claimed invention.

It is to be understood that one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system, or sold separately. It is obvious that when dealing with a full, complex software system, thousands of code entities and relationships must be analyzed and their attributes stored and recovered for later use in forming various different types of augmented DSMs, depending on a particular focusing metric. Only a computer system with sufficient hardware and software capabilities can perform these functions.

Additionally, at least one program storage device readable by a machine, tangibly embodying at least one program of instructions executable by machine to perform the capabilities of the present invention can be provided.

While the preferred embodiment to the invention has been described, it will be understood that those skilled in the art, both now and in the future, may make various improvements and enhancements which fall within the scope of the claims which follow. Indeed, as noted above, while the various features of the present invention have been described in detail in association with the visualization of a software system, the technique and tool is usable with any type of system that can be defined as a hierarchical tree structure, encompassing various branches and having terminating leaf nodes with relationships defined between the leaf nodes. Thus, the following claims are to be construed to maintain the proper protection for the invention first described.

What is claimed is:

1. A computer-implemented method for visually displaying relationships between code entities forming a software system, the method comprising the steps of:
    defining a plurality of code entities forming the software system;
    determining and storing all relationships between various pairs of code entities forming the plurality of code entities;
    selecting a metric to be used in evaluating the software system;
    creating a design structure matrix visualization of the software system, using the selected metric as the definition of the coordinates of the matrix and displaying code entities as squares of size relative to the selected metric and arranged along a diagonal of the matrix according to a specified ordering, with sub-entities of appropriate size displayed within their associated higher-level code entities, the design structure matrix being a symmetric square matrix with downward relationships from higher to lower code entities displayed below the diagonal and upward relationships displayed above the diagonal;
    identifying a subset of the code entities as large code entities based on the size of the squares displayed in the design structure matrix visualization exceeding a specific threshold;
    determining aggregated values of relationships between pairs of code entities displayed in the design structure matrix visualization, each aggregated value indicating a total number of relationships between a pair of code entities; and
    only for pairs of large code entities, displaying the aggregated values within the intersections between the pairs of appropriate code entities.

2. The computer-implemented method as defined in claim 1 wherein larger code entities within the design structure matrix each include an identifier defining that specific code entity.

3. The computer-implemented method as defined in claim 1 wherein the selected metric is computable from the source code of the software system.

4. The computer-implemented method as defined in claim 3 wherein the selected metric is defined as the number of lower-level code entities contained within a higher-level code entity.

5. The computer-implemented method as defined in claim 3 wherein the selected metric is defined as the cyclomatic complexity of the software system.

6. The computer-implemented method as defined in claim 1 wherein the selected metric is associated with software development lifecycle artifacts.

7. The computer-implemented method as defined in claim 6 wherein the selected metric is associated with the number of defects identified within each code entity.

8. The computer-implemented method as defined in claim 6 wherein the selected metric is associated with the technical debt of each code entity.

9. The computer-implemented method as defined in claim 1, where the method further comprises the ability to zoom into selected regions of the matrix and create an enlarged view of a selected portion of the matrix so to display aggregated relationship information and code identity information not shown in the original visualization.

10. A system having a memory storing executable instructions for creating a visual display of relationships between code entities forming a software system as a function of a user-defined focusing metric, the system comprising:
    means for identifying and storing all relationships between various pairs of the code entities forming the software system;
    means for creating a design structure matrix visualization of the software system, using the selected metric as the definition of the coordinates of the matrix and displaying code entities as squares of size relative to the selected metric and arranged along a diagonal of the matrix according to a specified ordering, with sub-entities of appropriate size displayed within their associated higher-level code entities, the design structure matrix being a symmetric square matrix with downward relationships from higher to lower code entities displayed below the diagonal and upward relationships displayed above the diagonal;
    means for identifying a subset of the code entities as large code entities based on the size of the squares displayed in the design structure matrix visualization exceeding a specific threshold; determining aggregated values of relationships between pairs of code entities displayed in the design structure matrix visualization, each aggregated value indicating a total number of relationships between a pair of code entities; and, only for pairs of large code entities, displaying the aggregated values within the intersections between the pairs of appropriate code entities.

11. The system as defined in claim 10 wherein the means for creating a design structure matrix visualization further includes the capability to zoom in on code entities and display identification and relationship information hidden in the original display view.

12. A computer implemented method for visually displaying relationships between entities forming a system, the system being of a hierarchical tree-and-branch structure and including relationships between the lowest-level entities of the system, the method comprising the steps of:
    defining a plurality of entities forming the system;
    determining and storing all relationships between various pairs of entities forming the plurality of entities;
    selecting a metric to be used in evaluating the system;
    creating a design structure matrix visualization of the system, using the selected metric as the definition of the coordinates of the matrix and displaying entities as squares of size relative to the selected metric and arranged along a diagonal of the matrix according to a specified ordering, with sub-entities of appropriate size displayed within their associated higher-level code entities, the design structure matrix being a symmetric square matrix with downward relationships from higher to lower code entities displayed below the diagonal and upward relationships displayed above the diagonal;
    identifying a subset of the entities as large entities based on the size of the squares displayed in the design structure matrix visualization exceeding a specific threshold;
    determining aggregated values of relationships between pairs of entities displayed in the design structure matrix visualization, each aggregated value indicating a total number of relationships between a pair of code entities; and only for pairs of large entities, displaying the aggregated values within the intersections between the pairs of appropriate entities.

13. Apparatus having a memory storing executable instructions for creating a visual display of relationships between entities forming a system as a function of a user-defined focusing metric, the system being of a hierarchical tree-and-branch structure and including relationships between the lowest-level entities of the system, the apparatus comprising:

means for identifying and storing all relationships between various pairs of the entities forming the system;

means for creating a design structure matrix visualization of the system, using the selected metric as the definition of the coordinates of the matrix and displaying c-oge entities as squares of size relative to the selected metric and arranged along a diagonal of the matrix according to a specified ordering, with sub-entities of appropriate size displayed within their associated higher-level code entities, the design structure matrix being a symmetric square matrix with downward relationships from higher to lower code entities displayed below the diagonal and upward relationships displayed above the diagonal;

means for identifying a subset of the entities as large entities based on the size of the squares displayed in the design structure matrix visualization exceeding a specific threshold; determining aggregated values of relationships between pairs of entities displayed in the design structure matrix visualization, each aggregated value indicating a total number of relationships between a pair of entities; and only for pairs of large entities, displaying the aggregated values within the intersections between the pairs of appropriate entities.

* * * * *